US012706913B2

(12) United States Patent
Kim et al.

(10) Patent No.: US 12,706,913 B2
(45) Date of Patent: Aug. 11, 2026

(54) NETWORK PROTECTION DEVICE AND METHOD FOR INTERNAL FLOW CONTROL VIA SWITCH ARP MODULATION AND ACCESS LISTS

(71) Applicant: VIASCOPE INC., Seoul (KR)

(72) Inventors: Chanwoo Kim, Seoul (KR); Janghun Kim, Yongin-si (KR); Boyoung Jeong, Uiwang-si (KR); Hyunpil Kim, Seoul (KR); Junseok Kang, Seoul (KR); Eunsung Shin, Seoul (KR); Jae Yong Choi, Seoul (KR); Dong-In Jeong, Seoul (KR); Jae-Young Choi, Seoul (KR); Hangryul Lee, Namyangju-si (KR)

(73) Assignee: VIASCOPE INC., Seoul (KR)

( * ) Notice: Subject to any disclaimer, the term of this patent is extended or adjusted under 35 U.S.C. 154(b) by 53 days.

(21) Appl. No.: 18/771,725

(22) Filed: Jul. 12, 2024

(65) Prior Publication Data

US 2025/0030693 A1 Jan. 23, 2025

(30) Foreign Application Priority Data

Jul. 17, 2023 (KR) ........................ 10-2023-0092623

(51) Int. Cl.
*H04L 9/40* (2022.01)
*H04L 61/103* (2022.01)
*H04L 61/4511* (2022.01)

(52) U.S. Cl.
CPC .......... *H04L 63/101* (2013.01); *H04L 61/103* (2013.01); *H04L 61/4511* (2022.05); *H04L 63/0236* (2013.01)

(58) Field of Classification Search
CPC . H04L 63/101; H04L 61/103; H04L 61/4511; H04L 63/0236; H04L 61/58; H04L 63/0876; H04L 2101/622
See application file for complete search history.

(56) References Cited

U.S. PATENT DOCUMENTS 7,567,573 B2 * 7/2009 Foss ........................ H04L 61/10 370/395.54
7,996,894 B1 * 8/2011 Chen ....................... H04L 63/08 709/239

(Continued)

FOREIGN PATENT DOCUMENTS

JP 2005-079706 A 3/2005
JP 2006-352719 A 12/2006

(Continued)

OTHER PUBLICATIONS

Office Action w/Examination Search Report for Canadian Patent Application No. 3,248,471 dated Jul. 28, 2025 (5 pages).

(Continued)

*Primary Examiner* — Jimmy H Tran
(74) *Attorney, Agent, or Firm* — ALSTON & BIRD LLP

(57) ABSTRACT

According to the present disclosure, a network protection device includes: a communication device; a storage device configured to store a white list that defines access rights between a plurality of first terminals belonging to a target network; and a control device configured to modulate an address resolution protocol (ARP) table of each of the plurality of first terminals using an ARP packet so that a first communication flow generated between the plurality of first terminals is received by the communication device, and block the first communication flow or transmit the first communication flow to a destination based on the white list when the first communication flow is received.

17 Claims, 8 Drawing Sheets

(56) References Cited

U.S. PATENT DOCUMENTS

2006/0050703 A1* 3/2006 Foss .................... H04L 63/1466 370/392
2007/0064689 A1* 3/2007 Shin ...................... H04L 61/103 370/395.54
2007/0097919 A1* 5/2007 Tsubota ................ H04L 61/103 370/331
2007/0192500 A1 8/2007 Lum
2008/0060067 A1* 3/2008 Kim ........................ H04L 63/10 726/7
2008/0216163 A1* 9/2008 Pratte ...................... G06F 21/36 726/7
2009/0124284 A1* 5/2009 Scherzer ........... H04M 1/72445 455/552.1
2009/0268668 A1* 10/2009 Tinnakornsrisuphap .................... H04L 61/103 370/328
2012/0304294 A1* 11/2012 Fujiwara ............. H04L 63/1466 726/22
2012/0311664 A1 12/2012 Elrod et al.
2013/0254891 A1* 9/2013 Onoda .................... H04L 49/70 726/23
2013/0276058 A1* 10/2013 Buldas ................ H04L 63/0876 726/2
2014/0013389 A1* 1/2014 Han ........................ G06F 21/74 726/3
2014/0019639 A1* 1/2014 Ueno .................... H04L 47/125 709/238
2014/0259146 A1* 9/2014 Zuk ......................... H04L 63/02 726/13
2015/0249666 A1* 9/2015 Kato ................... H04L 63/1458 726/7
2016/0140335 A1* 5/2016 Proulx .................. H04L 9/0863 726/6
2016/0366160 A1* 12/2016 Kapoor ............... H04L 41/0866
2017/0078319 A1* 3/2017 Thompson ............ G06F 21/316
2019/0007501 A1* 1/2019 Aoki ....................... H04L 63/08
2019/0081946 A1 3/2019 Xu
2019/0149516 A1 5/2019 Rajahalme et al.
2021/0211402 A1* 7/2021 Maarseveen ........ H04L 61/5014
2021/0288908 A1* 9/2021 Smith ..................... H04L 45/64
2021/0367924 A1 11/2021 Ong
2022/0231990 A1* 7/2022 Maarseveen .......... H04L 61/103
2025/0030639 A1* 1/2025 Hadavi ................. H04L 47/621

FOREIGN PATENT DOCUMENTS

JP 2008-109357 A 5/2008
JP 2012-034129 A 2/2012
JP 2015-170219 A 9/2015
KR 100432675 B2 5/2004
KR 10-0893935 B1 4/2009
KR 10-1018029 B1 3/2011
KR 10-2018-0015032 2/2018
KR 10-2298736 B1 9/2021
KR 10-2022-0091228 A 6/2022
KR 10-2510093 B1 3/2023

OTHER PUBLICATIONS

Extended European Search Report for EP Patent Application No. 24187922.0 dated Nov. 28, 2024 (10 pages).

* cited by examiner

NETWORK PROTECTION DEVICE AND METHOD FOR INTERNAL FLOW CONTROL VIA SWITCH ARP MODULATION AND ACCESS LISTS

CROSS-REFERENCE TO RELATED APPLICATION

This application claims priority to and the benefit of Korean Patent Application No. 10-2023-0092623 filed in the Korean Intellectual Property Office on Jul. 17, 2023, the entire contents of which are incorporated herein by reference.

BACKGROUND

1. Field

The present disclosure relates to a device and method for protecting a network, and more particularly, to a device and method for protecting a network for preventing the spread of malicious codes.

2. Description of the Related Art

Recently, many malicious codes are actively using infection routes such as internal networks to steal key data and increase the scale of damage. Damage caused by the malicious code infection is not limited to the infected system, but spreads to all systems on the same network, increasing the scale of damage. Even if the spread of damage from one infected system to other systems may be prevented, it is possible to dramatically reduce the damage caused by the malicious code.

The malicious code is distributed through a variety of methods, such as disguising the malicious code as a secure email, such as a card billing statement, or web cookie theft, sidejacking, or session hijacking. Recently, the distribution trend of the malicious codes is changing to a manner in which a hacker group who specializes in stealing only access rights infiltrates little by little over a long period of time to gain the access rights, plants the malicious codes, and sells the information to another hacker group who makes financial gain.

When the system infected with the malicious code includes important information, the victim has no choice but to pay the amount demanded by the hacker, and even after the victim pays the amount, there is no guarantee that the information will not be recovered or distributed. To prepare for an attack, attention of all members is required, but it is also necessary to prevent damage from spreading to many other systems connected to the same network due to one system infected with the malicious code.

SUMMARY

The present disclosure attempts to provide a device and method for protecting a network capable of preventing malicious codes from entering the network and preventing damage caused by the malicious code from spreading between terminals connected to the same network or between the networks.

According to an embodiment of the present disclosure, a network protection device includes: a communication device, a storage device configured to store a white list that defines access rights between a plurality of first terminals belonging to a target network, and a control device configured to modulate an address resolution protocol (ARP) table of each of the plurality of first terminals using an ARP packet so that a first communication flow generated between the plurality of first terminals is received by the communication device, and block the first communication flow or transmit the first communication flow to a destination based on the white list when the first communication flow is received.

The control device may be further configured to generate an ARP response packet including, as a source address information, an IP address of a first terminal in which a media access control (MAC) address is to be modified within the ARP table and the MAC address of the network protection device, and modulate the ARP table by transmitting the ARP response packet to each of the plurality of first terminals.

The control device may be further configured to collect address information of each of the plurality of first terminals using an ARP request packet. The address information may includes an IP address and a MAC address of the corresponding first terminals.

The control device may be further configured to detect an unauthorized terminal among the plurality of first terminals based on the address information, and modify a MAC address included in an ARP table of the unauthorized terminal into a MAC address with which communication is not possible using an ARP packet to block a communication by the unauthorized terminal.

The control device may be further configured to execute a completely automated public turing test to tell computers and humans apart (CAPTCHA) process in a first terminal which is a source of the first communication flow when the received first communication flow is a communication flow permitted to access by the white list, and block the received first communication flow or transmit the received first communication flow to a destination according to a CAPTCHA authentication result in the first terminal which is the source.

The storage device may further store a black list that defines access rights between the plurality of first terminals and an external network of the target network.

The control device may be further configured to modulate the ARP table of each of the plurality of first terminals using an ARP packet so that a second communication flow transmitted from any one of the plurality of first terminals to the external network is received by the communication device, and block the second communication flow or transmit the second communication flow to the external network based on the black list when the second communication flow is received.

The control device may be further configured to generate an ARP response packet including an IP address of a gateway connected between the plurality of first terminals and the external network and a MAC address of the network protection device as source address information, and modulate a MAC address of the gateway in the ARP table by transmitting the ARP response packet to each of the plurality of first terminals.

The control device may be further configured to store domain name system (DNS) information of a DNS response packet in a DNS table each time the DNS response packet is received from the external network, and block the second communication flow without transmitting the second communication flow to a destination when it is determined that the second communication flow is a communication flow generated without a DNS query by referring to the DNS table. The DNS information may include an IP address and a domain address included in the DNS response packet.

The control device may be further configured to store flow information of a communication flow whose source or destination is the plurality of first terminals in a flow table, determine whether a third communication is a communication flow generated by a request from any one of the plurality of first terminals by referring to the flow table when the third communication flow directed to any one of the plurality of first terminals is received from an external network of the target network, and transmit the third communication flow to the first terminal as the destination when it is determined that the third communication flow is a communication flow generated by a request from any one of the plurality of first terminals. The flow information may include address information of the source and destination of the corresponding communication flow and protocol information.

The control device may be further configured to instruct a second terminal on which an agent is installed to detect an access point (AP) located on a communication path between the network protection device and the second terminal, instruct the second terminal to collect terminal information of at least one third terminal connected to the AP when the AP is detected in the communication path by the second terminal, receive address information of the at least one third terminal collected by the second terminal using an ARP packet from the second terminal, detect an unauthorized terminal among the at least one third terminal based on the address information of the at least one third terminal, and instruct the second terminal to block the communication of the unauthorized terminal using an ARP packet when the unauthorized terminal is detected.

According to an embodiment of the present disclosure, a method for protecting a network of a network protection device includes: modulating an ARP table of each of a plurality of first terminals belonging to a target network using an ARP packet so that a first communication flow generated between the plurality of first terminals is received by the network protection device; and blocking the first communication flow or transmitting the first communication flow to a destination based on a white list defining access rights between the plurality of first terminals when the first communication flow is received.

The modulating may include: generating an ARP response packet including, as a source address information, an IP address of a first terminal in which a media access control (MAC) address is to be modified within the ARP table and a MAC address of the network protection device; and modulating the ARP table by transmitting the ARP response packet to each of the plurality of first terminals.

The method may further include collecting address information for each of the plurality of first terminals using an ARP request packet. The address information may include an IP address and a MAC address of the corresponding first terminal.

The method may further include: detecting an unauthorized terminal among the plurality of first terminals based on the address information; and modifying a MAC address included in an ARP table of the unauthorized terminal into a MAC address with which communication is not possible using an ARP packet to block a communication by the unauthorized terminal.

The method may further include: executing a CAPTCHA process in a first terminal that is a source of the first communication flow; and receiving a CAPTCHA authentication result from the first terminal that is the source. The blocking of the first communication flow or the transmitting of the first communication flow to the destination may include blocking the first communication flow or transmitting the first communication flow to a destination based on the CAPTCHA authentication result and the white list.

The method may further include: modulating the ARP table using an ARP packet so that a second communication flow transmitted from any one of the plurality of first terminals to an external network of the target network is received by the network protection device; and blocking the second communication flow or transmitting the second communication flow to the external network by referring to a black list defining access rights between the plurality of first terminals and the external network when the second communication flow is received.

The modulating of the ARP table so that the second communication flow is received by the network protection device may include: generating an ARP response packet including an IP address of a gateway connected between the plurality of first terminals and the external network and a MAC address of the network protection device as source address information; and modulating a MAC address of the gateway in the ARP table by transmitting the ARP response packet to each of the plurality of first terminals.

The method may further include: whenever a DNS response packet is received from the external network, storing DNS information of the received DNS response packet in a DNS table. The blocking of the second communication flow or the transmitting of the second communication flow to the external network may include: determining whether the second communication flow is a communication flow generated without a DNS query by referring to the DNS table; and blocking the second communication flow without transmitting the second communication flow to a destination when the second communication flow is a communication flow generated without a DNS query. The DNS information may include an IP address and a domain address included in the DNS response packet.

The method may further include: whenever the communication flow is generated with the plurality of first terminals as the source or destination, storing flow information of the generated communication flow in a flow table; receiving a third communication flow from the external network of the target network to any one of the plurality of first terminals; and transmitting the third communication flow to a first terminal as the destination when it is determined by referring to the flow table that the third communication flow is a communication flow generated by a request from any one of the plurality of first terminals. The flow information may include address information of the source and destination of the corresponding communication flow and protocol information.

According to the present disclosure, it is possible to prevent the malicious code from entering the network and prevent the damage caused by malicious code from spreading between the terminals connected to the same network or between the networks.

DETAILED DESCRIPTION OF THE EMBODIMENTS

Figure 1A:
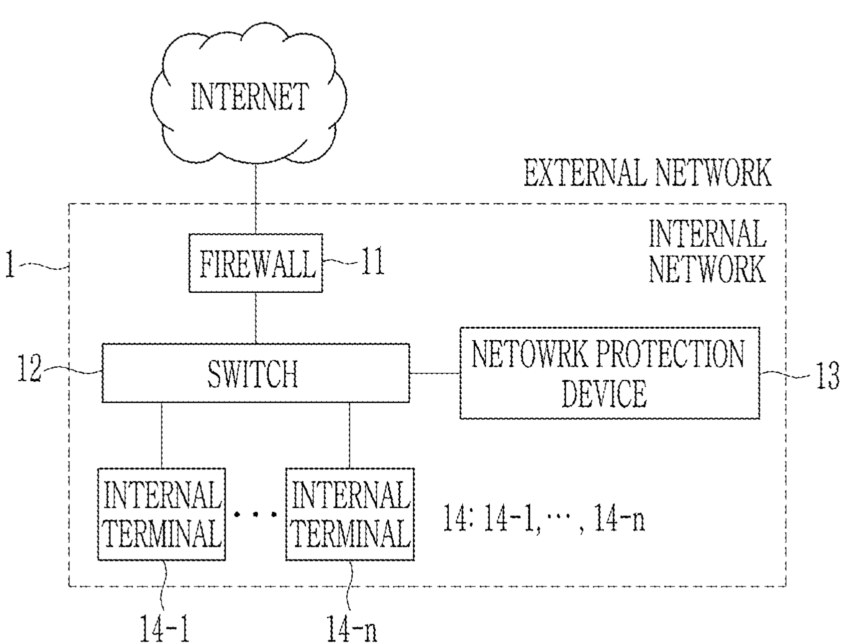
FIG. 1A is a diagram illustrating an example of a network system to which a network protection device according to an embodiment is applied.

Hereafter, embodiments of the present disclosure will be described in detail with reference to the accompanying drawings and the same or similar components are given the same reference numerals and are not repeatedly described. The suffix "module" and/or "unit" for components used in the following description is given or mixed in consideration of only the ease of writing of the specification, and therefore, do not have meanings or roles that distinguish from each other in themselves. Further, when it is decided that a detailed description for the known art related to the present disclosure may obscure the gist of the present disclosure, the detailed description will be omitted. Further, it should be understood that the accompanying drawings are provided only in order to allow exemplary embodiments of the present disclosure to be easily understood, and the spirit of the present disclosure is not limited by the accompanying drawings, but includes all the modifications, equivalents, and substitutions included in the spirit and the scope of the present disclosure.

Terms including an ordinal number such as first, second, etc., in this disclosure may be used to describe various components, but the components are not limited to these terms. The above terms are used solely for the purpose of distinguishing one component from another.

Singular forms are to include plural forms unless the context clearly indicates otherwise.

It will be further understood that terms "include" or "have" used in the present specification specify the presence of features, numerals, steps, operations, components, parts mentioned in the present specification, or combinations thereof, but do not preclude the presence or addition of one or more other features, numerals, steps, operations, components, parts, or combinations thereof.

FIG. 1A is a diagram illustrating an example of a network system to which a network protection device according to an embodiment is applied.

Referring to FIG. 1A, packets transmitted and received between a network 1 (hereinafter referred to as 'target network') to be protected and an external network (e.g., Internet) pass through a firewall 11 and a switch 12. The firewall 11 is responsible for security of the target network 1 and may perform a function of blocking harmful traffic entering or leaving the target network 1. In this document, the internal network and external network of the target network 1 are divided based on the use of a router, and may also be divided based on whether to use the same broadcast domain. In the network system, the router divides networks and blocks broadcasts from being transmitted to other networks. In this case, the range within which the broadcast reaches is called the broadcast domain.

The switch 12 may operate as a backbone switch located at a center of nodes wishing to connect to the Internet in the target network 1. In this case, all packets transmitted and received between the target network 1 and the external network pass through the switch 12. The switch 12 may operate as a gateway of the target network 1. The gateway may transmit packets between the external network and the target network 1 based on a destination Internet protocol (IP) address included in each packet.

The switch 12 may support communication between terminals (hereinafter referred to as 'internal terminal') 14 (14-1, . . . , 14-*n*) belonging to the target network 1. The internal terminal 14 may include network peripheral devices such as a network address translation (NAT) device (e.g., AP 151 in FIG. 1B to be described later) and a printer, in addition to the network terminal and server belonging to the target network 1.

The target network 1 may further include a network protection device 13 to prevent damage from rapidly spreading when malicious codes are installed in the internal terminal 14. The network protection device 13 may be connected to the switch 12 to communicate with the internal terminal 14 or the gateway (or the switch 12 that functions as the gateway).

The network protection device 13 may detect terminal information of the internal terminals 14 belonging to the target network 1 using an address resolution protocol (ARP) packet. The network protection device 13 may isolate the internal terminals 14 of the target network 1 so that a communication flow generated in the internal terminals 14 is transmitted only through the network protection device 13. The network protection device 13 may block or allow the communication flow between the internal terminals 14 of the target network 1 using a white list and a flow cache table. The network protection device 13 may block or allow the communication flow between the internal terminal 14 and the external network using a black list and a domain name system (DNS) cache table.

Each internal terminal 14 may collect process information on a process executed in the background of the internal terminal 14. The process information may include an execution path of the process executed in the background, communication information (e.g., IP address and port number of a destination, protocol information (TCP, UDP, etc.)) used in the corresponding process, etc. The Internal terminals 14 may transmit the collected process information to the network protection device 13. An agent for collecting the process information may be installed in each internal terminal 14 in the form of an application.

The network protection device 13, which receives the process information from each internal terminal 14, may additionally perform a function of comparing the received process information with the white list to determine whether each internal terminal 14 is infected with malware. When the network protection device 13 determines that a specific internal terminal 14 is infected with malware, it may block the communication flow generated by the internal terminal 14.

Figure 1B:
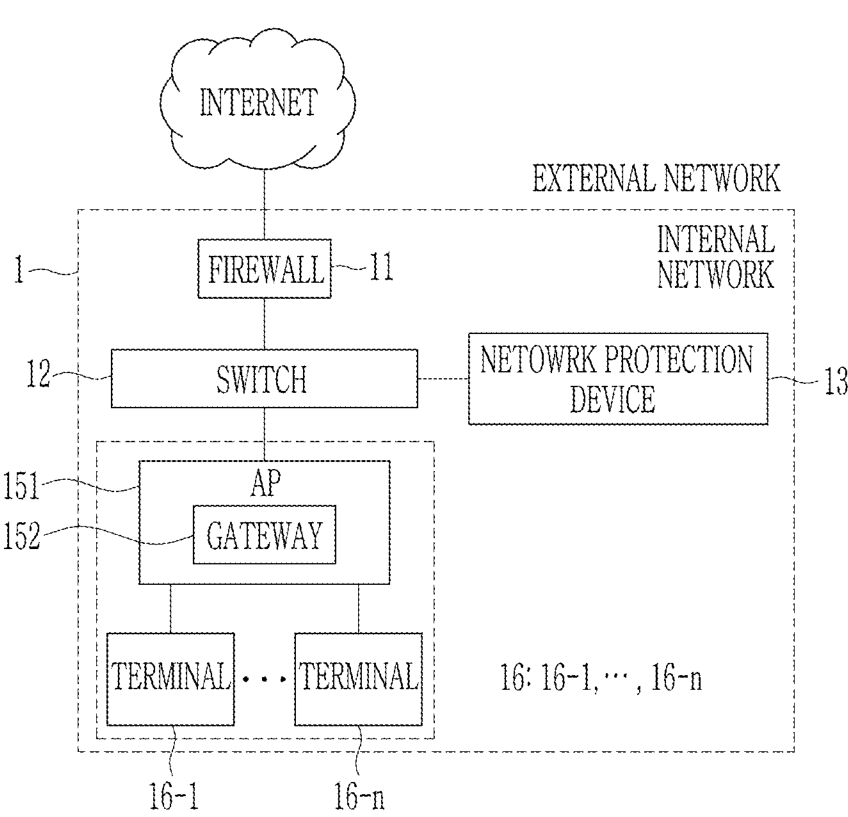
FIG. 1B is a diagram illustrating an example in which a private network of a network system to which the network protection device according to the embodiment is applied is present.

FIG. 1B is a diagram illustrating another example of a network system to which an network protection device according to an embodiment is applied.

Referring to FIG. 1B, the target network 1 may include a private network 15 connected through an access point (AP) 151 (or NAT device). The private network 15 may include an AP 151 and terminals 16 (16-1, . . . , **16-*n*) connected to the AP 151**.

The network protection device 13 may additionally perform a function of detecting the AP 151.

An agent for communicating with the network protection device 13 may be installed in a terminal 16 belonging to the private network 15. In this case, the network protection device 13 may detect the AP 151 by communicating with the agent installed in the terminal 16. When the AP 151 of the private network 15 is detected within the target network 1, the network protection device 13 may communicate with the agent of the terminal 16 to collect the address information of the terminals 16 connected to the corresponding AP 151. In addition, the network protection device 13 may detect an unauthorized terminal connected to the AP 151 of the private network 15 based on the collected address information of the terminals 16. The network protection device 13 may also communicate with the agent of the terminal 16 to block the communication between the unauthorized terminal connected to the AP 151 and the terminal 16 in which the agent is not installed. The agent of the terminal 16 may block the communication between the unauthorized terminal and the terminal on which the agent is not installed by continuously transmitting the ARP packet to the gateway 152 of the AP 151 and the terminal 16 that is a target to be blocked.

When the agent is not installed in the terminal 16, the network protection device 13 may detect the AP 151 of the private network 15 by performing a self-detection process.

Figure 2:
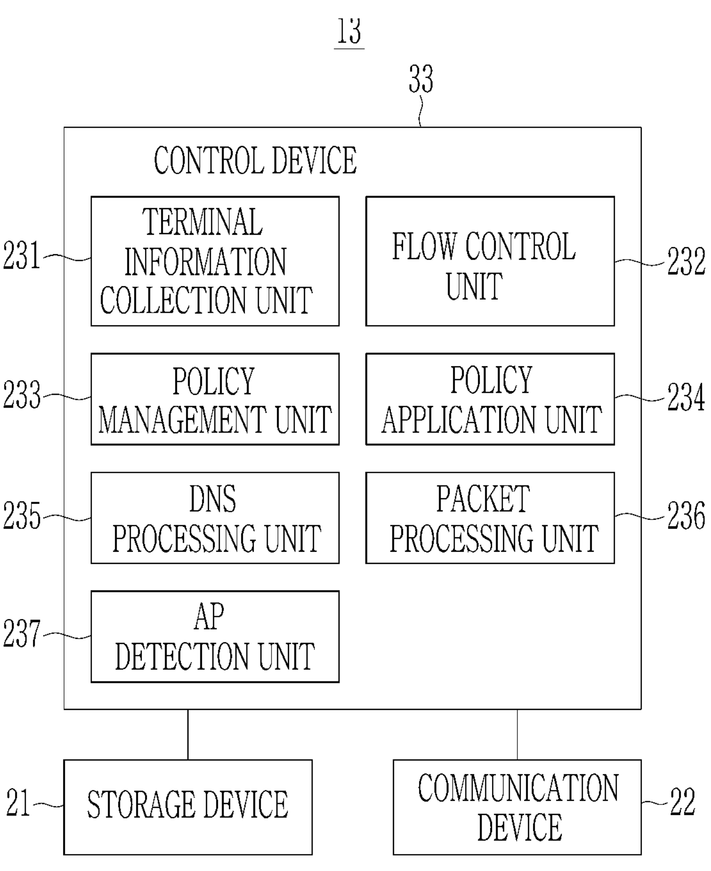
FIG. 2 is a diagram schematically illustrating the network protection device according to the embodiment.

FIG. 2 is a diagram schematically illustrating the network protection device according to the embodiment.

Referring to FIG. 2, the network protection device 13 according to an embodiment may include a storage device 21, a communication device 22, and a control device 23.

The storage device 21 includes at least one memory and may store various information, data, etc., processed by the network protection device 13.

The storage device 21 may temporarily store packets transmitted through the network protection device 13.

The storage device 21 may store policy information used in the network protection device 13. The policy information may include a band Management policy in the target network 1. The band Management policy may include static information on the band Management of the target network 1, such as an IP address range assigned to the target network 1 and virtual local area network (VLAN) information.

The storage device 21 may store terminal information of each internal terminal 14 acquired by the control device 23, which will be described later. The terminal information may include address information (IP address and MAC address), state information (online state), etc., of each internal terminal 14.

The storage device 21 may store flow information of the communication flow transmitted through the network protection device 13 in the form of the flow cache table. The flow information may include 5-tuple information including an IP address and a port number of a source of the corresponding communication flow, an IP address and a port number of a destination, and protocol information.

The storage device 21 may also store a white list. The white list may include information related to access permission between the internal terminals 14 within the target network 1. That is, the white list may include information on which internal terminals 14 are permitted to access other internal terminals 14 within the target network 1, that is, access permission information between terminals. The white list may include the 5-tuple information including the IP address information (or IP address band), the port number, the protocol information, etc., permitted to access each internal terminal 14 registered in the white list. The white list may further include information on software that is essentially installed in the internal terminal 14 depending on an operating system.

The storage device 21 may also store the black list. The black list may include information related to restrictions on access of the internal terminals 14 to the external network of the target network 1. That is, the black list may include information on the destination (e.g., web servers, etc.) in the external network that is not permitted to access each internal terminal 14 registered in the black list. That is, the black list may include an IP address, domain information, etc. that are not permitted to access each internal terminal 14 of the target network 1.

The storage device 21 may also store an exception list. The exception list may include information (IP address, domain information, etc.) on the external network that is permitted to access the internal terminals 14 of the target network 1.

The storage device 21 may store DNS information of DNS response packets generated between the external network and the internal terminal 14 in the form of a DNS cache table. The DNS information is information extracted from the DNS response packet and may include destination address information (IP address and domain address) of a destination (e.g., web server) within the external network which the internal terminal 14 wishes to access.

The communication device 22 may transmit and receive information, packets, etc., between other devices belonging to the target network 1 and the network protection device 13. The communication device 22 may be connected to each internal terminal 14 connected to the target network 1 through the switch 12, and transmit and receive packets (ARP packet, user datagram protocol (UDP) packet, transmission control protocol (TCP) packet, etc.) to and from each internal terminal 14. The communication device 22 is connected to the external network through the gateway (e.g., the switch 12 that performs a gateway function), and may also transmit and receive packets to and from the external network.

The control device 23 may collect terminal information of the internal terminals 14 belonging to the target network 1. The control device 23 may control the communication flows of the internal terminals 14 so that all packets between the internal terminals 14 belonging to the target network 1 and between the internal terminal 14 and the gateway (i.e. between the internal terminal 14 and the external network) are transmitted through the network protection device 13. The control device 23 may refer to the white list, the black list, the exception list, the flow cache table, the DNS cache table, etc., stored in the storage device 21 to permit or block the packet transmission between the internal terminals 14 belonging to the target network 1 and between the internal terminal 14 and the external network.

To this end, the control device 23 may include a terminal information collection unit 231, a flow control unit 232, a policy management unit 233, a policy application unit 234, a DNS processing unit 235, and a packet processing unit 236.

When the network protection device 13 starts an operation, the terminal information collection unit 231 may collect terminal information (address information, state information, etc.) of the internal terminals 14 belonging to the target network 1.

The terminal information collection unit 231 may collect address information (IP address and MAC address) of each internal terminal 14 using an ARP request packet. During the initial operation of the network protection device 13, the IP address of each internal terminal 14 is unknown, so the terminal information collection unit 231 may generate an ARP request packet for collecting the address information based on the band Management policy of the target network 1. The terminal information collection unit 231 may select a random IP address from the IP address range assigned to the target network 1, generate an ARP request packet including the selected IP address data as destination address information, and transmit the generated ARP request packet to the internal terminals 14.

When there is the internal terminal 14 corresponding to the destination IP address of the ARP request packet transmitted in this way, the corresponding internal terminal 14 may transmit the ARP response packet including its own IP address and MAC address as the source address information to the network protection device 13 in a unicast manner. When the ARP response packet is received, the terminal information collection unit 231 may acquire the address information (IP address and MAC address) of the corresponding internal terminal 14 from the source address information (source IP address and source MAC address) included in the corresponding response packet.

The terminal information collection unit 231 may generate the ARP request packet while changing the IP address used as the destination address information within the IP address range assigned to the target network 1. The terminal information collection unit 231 may sequentially broadcast the ARP request packets having the changed destination address information to the internal terminals 14. The terminal information collection unit 231 may wait to receive a response packet whenever the ARP request packet is broadcast, and when the ARP response packet is received, collect the address information of all the internal terminals 14 connected to the target network 1 by analyzing the received ARP response packet and acquire the address information of the corresponding internal terminal 14. The terminal information collection unit 231 may also set the state information to indicate an online state for the internal terminal 14 that has transmitted the ARP response packet.

The terminal information collection unit 231 may monitor the online state of each internal terminal 14 using the ARP packet. The terminal information collection unit 231 may generate the ARP request packet including the IP address of the internal terminal 14 whose online state is to be checked as the destination address information and broadcast the generated ARP request packet within the target network 1. Then, the terminal information collection unit 231 may determine the state information of the corresponding internal terminal 14 according to whether the ARP response packet for the transmitted ARP request packet is received. The terminal information collection unit 231 may transmit the ARP request packet to the internal terminal 14 whose state is to be checked at least once during a predetermined period of time, and then wait to receive the ARP response packet from the corresponding internal terminal 14. When not receiving the ARP response packet from the corresponding internal terminal 14 within a predetermined time after transmitting the ARP request packet, the terminal information collection unit 231 may determine that the corresponding internal terminal 14 is in an off state. When receiving the ARP response packet from the corresponding internal terminal 14 within a predetermined time after transmitting the ARP request packet, the terminal information collection unit 231 may determine that the corresponding internal terminal 14 is in an on state. The terminal information collection unit 231 may also set the state information of each internal terminal 14 based on the determined state. Here, the online state of the internal terminal 14 may indicate the state in which the connection between the corresponding internal terminal 14 and the target network 1 is activated, and the offline state of the internal terminal 14 may indicate the state in which the connection between the corresponding internal terminal 14 and the target network 1 is deactivated.

When the terminal information (state information and address information) of each internal terminal 14 is collected in the above-described manner, the terminal information collection unit 231 may store and manage the collected terminal information in the storage device 21.

The flow control unit 232 may use the terminal information and the ARP packet of the internal terminals 14 belonging to the target network 1 to control the communication flows of the internal terminals 14 to transmit the communication flows of all the internal terminals 14 through the network protection device 13.

In order to change the communication flows of the internal terminals 14, the flow control unit 232 may modulate MAC addresses of other internal terminals 14 and gateways in the ARP table stored in each internal terminal 14. The ARP table of each internal terminal 14 may include the address information (IP address and MAC address) of the network device (e.g., internal terminals 14) belonging to the same broadcast domain (target network 1) as the corresponding internal terminal 14 and the address information (IP address and MAC address) of the gateway (or switch 12 serving as a gate) to which the corresponding network device is connected.

The flow control unit 232 may use the modulated ARP response packets to modulate the MAC addresses of the internal terminals 14 in the ARP table. Each modified ARP response packet may include the IP address and MAC address of the internal terminal 14 whose ARP table is to be modulated as the destination address information, and include the IP address and the modulated MAC address (MAC address of the network protection device 13) of the target (internal terminal) whose MAC address is to be modulated within the corresponding ARP table as the source address information. When the modulated ARP response packet is generated, the flow control unit 232 may transmit the generated ARP response packet to the internal terminal 14 whose ARP table is to be modulated in the unicast manner. The internal terminal 14, which has received the modulated ARP response packet from the network protection device 13, may acquire the IP address and modulated MAC address of the source from the received ARP response packet, and use the acquired IP address and modulated MAC address of the source to change the MAC address of the corresponding internal terminal 14 in its own ARP table.

In order to modulate the MAC addresses of all the internal terminals 14 in the ARP table of each internal terminal 14 into the MAC address of the network protection device 13, the flow control unit 232 may transmit the ARP response packet to each internal terminal 14 more than once.

As the MAC addresses of all other internal terminals 14 belonging to the target network 1 in the ARP table of each internal terminal 14 are modulated into the MAC address of the network protection device 13, when each internal terminal 14 wants to transmit a packet to other internal terminals, the internal terminal 14 refers to the MAC address of the network protection device 13, not the MAC address of the corresponding internal terminal to transmit the packet. Accordingly, the packets transmitted from each internal terminal 14 to other internal terminals 14 may first be transmitted to the network protection device 13 instead of the corresponding internal terminal.

In order to modulate the MAC address of the gateway (or switch 12 that functions as the gateway) in the ARP table of each internal terminal 14 into the MAC address of the the network protection device 13, the flow control unit 232 may use the modulated ARP response packet. Here, the modified ARP response packet may include the IP address and the MAC address of the internal terminal 14 whose ARP table is to be modified as the destination address information, and include the IP address (IP address of the switch 12) of the actual gateway and the MAC address of the network protection device 13 as the source address information. When the modulated ARP response packet is generated, the flow control unit 232 may transmit the generated ARP response packet to the internal terminal 14, which is the ARP table modulation target, in a unicast manner. The internal terminal 14, which has received the ARP response packet in which the MAC address of the gateway is modulated from the network protection device 13, may use the modulated MAC address of the gateway acquired from the ARP response packet to change the MAC address of the gateway in its own ARP table.

As described above, the flow control unit 232 may transmit the ARP response packet in which the MAC address of the gateway is modulated to each internal terminal 14, and modulate the MAC address of the gateway in the ARP table of all the internal terminals 14 belonging to the target network 1 to the MAC address of the network protection device 13.

As the MAC address of the gateway in the ARP table of each internal terminal 14 is modulated into the MAC address of the network protection device 13, when each internal terminal 14 wants to transmit a packet to the outside target network 1, each internal terminal refers to the MAC address of the network protection device 13, not the gateway, to transmit the packet. Accordingly, the packets transmitted from each internal terminal 14 to the outside of the target network 1 may first be transmitted to the network protection device 13 instead of the gateway.

As described above, the flow control unit 232 may modulate the ARP table of each internal terminal 14 using the ARP packet, and thus, isolate the internal terminals 14 so that the transmitted and received packets of all the internal terminals 14 pass through the network protection device 13 and are transmitted to other internal terminals 14 or the external network.

The flow control unit 232 may use the modulated ARP packet to block the communication flow of the unauthorized internal terminal (not illustrated) connected to the target network 1.

The flow control unit 232 may use the modulated ARP response packets to modulate the MAC addresses of all other internal terminals 14 belonging to the target network 1 in the ARP table of the unauthorized internal terminal into meaningless MAC addresses that cannot communicate. The flow control unit 232 may generate the ARP response packet that is modulated to include the IP address and meaningless MAC address of each internal terminal 14 as the source address information and the IP address and MAC address of the unauthorized internal terminal as the destination address information. The flow control unit 232 may transmit the ARP response packet thus modulated to the unauthorized internal terminal in the unicast manner. The unauthorized internal terminal that receives the ARP response packet may change the MAC address of the corresponding internal terminal 14 in its own ARP table to the meaningless MAC address that cannot communicate. Accordingly, the unauthorized internal terminal may not confirm the correct MAC addresses of the other internal terminals 14 belonging to the target network 1, so the communication with the other internal terminals 14 may be blocked.

The flow control unit 232 may use the modified ARP response packet to modulate the MAC address of the gateway in the ARP table of the unauthorized internal terminal into the meaningless address. The flow control unit 232 may generate the ARP response packet that is modulated to include the IP address and meaningless MAC address of the gateway as the source address information and the IP address and MAC address of the unauthorized internal terminal as the destination address information. The flow control unit 232 may transmit the ARP response packet thus modulated to the unauthorized internal terminal in the unicast manner. The unauthorized internal terminal that receives the ARP response packet may change the MAC address of the gateway in its own ARP table to the meaningless MAC address that cannot communicate. Accordingly, the unauthorized internal terminal may not confirm the correct MAC address of the gateway, so the communication with the external network to be accessed through the gateway may be blocked.

The policy management unit 233 may set policy information for managing the internal terminals 14 belonging to the target network 1. The policy management unit 233 may receive input information for registering policy information from an administrator or an administrator terminal (not illustrated) and generate the policy information based on the received input information. The policy management unit 233 may store and manage the set policy information in the storage device 21.

The policy management unit 233 may generate the white list, the black list, or the exception list used in the target network 1. The policy management unit 233 may receive the input information for registering the white list, the black list, or the exception list from the administrator or the administrator terminal (not illustrated) and generate the white list, the black list, or the exception list based on the received input information. The policy management unit 233 may store and manage the set white list, black list, or exception list in the storage device 21.

The policy application unit 234 may transmit the policy information registered by the policy management unit 233 to a component (e.g., the packet processing unit 236) that requires the policy information so that the policy information may be applied.

The DNS processing unit 235 may analyze the DNS response packet generated between the external network and the internal terminal 14, and acquire the DNS information (IP address and domain address) of the destination (e.g., web server) in the external network to which the internal terminal 14 wishes to access. The DNS processing unit 235 may store and manage the acquired DNS information in the storage device 21 in the form of the DNS cache table.

The packet processing unit 236 may receive packets transmitted between the internal terminals 14 or between the external network of the target network 1 and the internal terminal 14, and transmit the received packets to the destination or block the received packets.

For the packet processing, the packet processing unit 236 may collect the flow information on the communication flow generated for the internal terminals 14. The packet processing unit 236 may collect the flow information by monitoring the communication flow that is generated between the internal terminal 14 and the external network. The packet processing unit 236 may collect the flow information by monitoring the communication flow that is generated between the internal terminals 14. The collected flow information may be the 5-tuple information including the IP address and port number of the source, the IP address and port number of the destination, and the protocol information. The packet processing unit 236 may store and manage the collected flow information in the storage device 21 in the form of the flow cache table. In order to simultaneously manage the two-way communication flow between the external network and the internal terminal 14, when storing the flow information in the flow cache table, the packet processing unit 236 may store the flow information using the communication flow from the inside of the target network 1 to the external network as a reference. In addition, in the case of the communication flow from an external network to the inside of the target network 1, when storing the flow information, the packet processing unit 236 may change the order in which destination information (IP address and port number) and source information (IP address and port number) are stored. In order to simultaneously manage the two-way communication flow between the internal terminals 14, the packet processing unit 236 may manage the storage order of the flow information based on the size comparison between the IP addresses of the source and destination, or an initial starting point of each communication flow.

When the communication flow for the internal terminal 14 of the target network 1 to connect to other internal terminals 14 is generated, the packet processing unit 236 may refer to the white list to determine whether the communication flow is permitted. When the communication flow that is generated between the internal terminals 14 is the communication flow registered in the white list, the packet processing unit 236 may normally transmit the packets of the corresponding communication flow to the internal terminal 14 which is the destination. The packet processing unit 236 may also add the flow information of the corresponding communication flow to the flow cache table. When the communication flow that is generated between the internal terminals 14 is the communication flow that is not registered in the white list, the packet processing unit 236 may block the packets of the corresponding communication flow to the internal terminal 14 which is the destination without transmitting the packets of the corresponding communication flow. The packet processing unit 236 may also add the flow information of the corresponding communication flow to the flow cache table.

When the internal terminal 14 is infected with malicious code, the background process of the internal terminal 14 may generate an arbitrary communication flow unintended by the user and access other internal terminals 14 registered in the white list. In this case, to prevent the malicious code from spreading to other internal terminals 14, the packet processing unit 236 may additionally perform security processes such as completely automated public turing test to tell computers and humans apart (CAPTCHA) by linking with the policy application unit 234.

When the communication flow for the internal terminal 14 to connect to other internal terminals 14 registered in the white list is generated, the policy application unit 234 may control the CAPTCHA process to be executed on the internal terminal 14 that attempts to access. Then, the policy application unit 234 may receive the authentication result by the CAPTCHA process from the corresponding internal terminal 14 and control the packet processing unit 236 according to the received authentication result. When the received authentication result indicates successful authentication, the policy application unit 234 may control the packet processing unit 236 to transmit the packets of the corresponding communication flow to the internal terminal 14 which is the destination. When the received authentication result indicates authentication failure, or the authentication result is not received for more than a predetermined time, the policy application unit 234 may control the packet processing unit 236 to block the packets of the corresponding communication flow without transmitting the packets of the corresponding communication flow to the internal terminal 14 which is the destination.

When the communication flow from the internal terminal 14 of the target network 1 to the external network is generated, the packet processing unit 236 may refer to the black list to determine whether to permit the communication flow. When the communication flow from the internal terminal 14 of the target network 1 to the external network is generated, the packet processing unit 236 may generate the flow information for the communication flow. The packet processing unit 236 may compare the generated flow information with the black list, and when the corresponding flow is the communication flow registered in the black list, may block the packets of the flow without transmitting the packets to the external network. When the packet processing unit 236 determines that the corresponding flow is a flow that is not registered in the black list, the packet processing unit 236 may pass the packets of the corresponding flow and transmit the packets to the external network.

When the internal terminal 14 is infected with the malicious code, the background process of the internal terminal 14 may directly generate the communication flow to the external network using the IP address without the DNS query. In this case, in order to prevent the malicious code from spreading, the packet processing unit 236 may use the DNS cache table.

When the DNS request packet is generated from the internal terminal 14, the packet processing unit 236 may transmit the DNS request packet to the external network and then wait for the DNS response packet to be received from the external network. When the DNS response packet is received, the packet processing unit 236 may transmit the received DNS response packet to the DNS processing unit 235 to detect the DNS information (IP address and domain address). The DNS processing unit 235 may acquire the DNS information (IP address and domain address) from the received DNS response packet and add the acquired DNS information to the DNS cache table.

When the DNS information of the communication flow from the internal terminal 14 of the target network 1 to the external network is not registered in the DNS cache table, the packet processing unit 236 may block the packet transmission of the corresponding communication flow regardless of the black list. When the DNS information of the communication flow from the internal terminal 14 of the target network 1 to the external network is the DNS information registered in the DNS cache table, as described above, the packet processing unit 236 may refer to the black list to permit or block the packet transmission of the corresponding communication flow.

When the communication flow from the external network to the internal terminal 14 of the target network 1 is generated, the packet processing unit 236 may confirm whether the corresponding communication flow is generated in response to the communication flow generated in the internal terminal 14. In the case of the communication flow generated by the request from the internal terminal 14, the corresponding flow information may already be registered in the flow cache table. Accordingly, the packet processing unit 236 may refer to the flow cache table to confirm whether the communication flow generated in the external network is the communication flow generated by the request from the internal terminal 14. When the communication flow generated in the external network is the communication flow generated by the request of the internal terminal 14, the packet processing unit 236 may transmit the communication flow to the internal terminal 14 which is the destination. When the communication flow generated in the external network is not generated by the request from the internal terminal 14, the packet processing unit 236 may refer to the exception list to permit or block the packet transmission of the corresponding communication flow. Even if the communication flow generated in the external network is not generated by the request from the internal terminal 14, when the communication flow is the communication flow registered in the exception list, the packet processing unit 236 may transmit the packets of the corresponding communication flow to the internal terminal 14 which is the destination.

The packet processing unit 236 may receive the process information from agents installed in each internal terminal 14 and determine whether each internal terminal 14 is infected with the malware using the received process information and the white list. Based on the received process information, when the corresponding process is executed in a path different from the path registered in the white list, when the process generates the communication flow using the IP address that has never been used before, and when the port number for waiting for reception/access in the communication flow changes, the packet processing unit 236 may determine that the corresponding internal terminal 14 is infected with the malware.

When it is determined that the internal terminal 14 is infected with the malware, the packet processing unit 236 may block the communication flow generated by the corresponding internal terminal 14.

When the private network 15 exists within the target network 1, the control device 23 may additionally perform the function of detecting the AP 151. To this end, the control device 23 may further include an AP detection unit 237.

An agent for communicating with the network protection device 13 may be installed in the terminal 16 belonging to the private network 15. In this case, the AP detection unit 237 may detect the AP 151 through communication with an agent installed in the terminal 16. The AP detection unit 237 may transmit a command instructing the detection of the AP 151 to the agent installed in the terminal 16. The agent of the terminal 16 that receives this command may use a traceroute command to trace the communication path between the corresponding terminal 16 and the network protection device 13 to detect the number of APs 151 located on the communication path. The terminal 16 may use the traceroute command to confirm whether only one AP 151 exists on the communication path or whether multiple APs exist hierarchically.

The agent of the terminal 16 may transmit the information on the identified number of APs 151 to the network protection device 13. The AP detection unit 237 may confirm the number of APs 151 included in the target network 1 based on the information received from the agent of the terminal 16, and display the information on the confirmed number of APs 151 on a screen to be notified to an administrator. Therefore, the administrator may easily identify security vulnerabilities caused by the private network 15 in the target network 1.

When the AP 151 of the private network 15 is detected within the target network 1 by the AP detection unit 237, the terminal information collection unit 231 may transmit the command to collect the information on the terminals 16 connected to the corresponding AP 151 to the agent installed in terminal 16. The agent of the terminal 16 that receives this command may collect the address information (IP address and MAC address) of the terminals 16 connected to the corresponding AP 151 using the ARP packet. Then, the agent of the terminal 16 may transmit the address information of the terminals 16 connected to the corresponding AP 151 to the network protection device 13. The terminal information collection unit 231 that receives the address information may store the received terminal information in the storage device 21.

The flow control unit 232 may detect the unauthorized terminal among the terminals 16 within the private network 15 based on the terminal information received from the terminal 16 within the private network 15. When the unauthorized terminal is detected, the flow control unit 232 may transmit a command to the agent of the terminal 16 instructing to block communication not only with the unauthorized terminal within the private network 15 but also with the terminal 16 in which the agent is not installed.

The agent of the terminal 16 that has received the communication blocking command may transmit the ARP packet for blocking communication to the gateway 152 in the AP 151 and the terminal 16 to be blocked. The agent of the terminal 16 transmits the ARP response packet with the modulated MAC address to the terminal 16 to be blocked, similar to the method of blocking the communication flow of the unauthorized terminal in the flow control unit 232 described above, so the communication flow of the corresponding terminal 16 may be blocked. The agent of the terminal 16 may continuously transmit the ARP packet for blocking communication before a blocking release command is received from the network protection device 13. When the administrator wishes to permit the communication to the terminal 16 whose communication is blocked, the administrator may control the network protection device 13 to transmit a command to permit the communication to the agent of the terminal 16.

When the agent is not installed in the terminal 16, the AP detection unit 237 may detect the AP 151 of the private network 15 by performing a self-detection process.

The control device 23 may include at least one processor to perform the above-described functions. Each processor may perform a function of at least one a terminal information collection unit 231, a flow control unit 232, a policy management unit 233, a policy application unit 234, a DNS processing unit 235, a packet processing unit 236, and an AP detection unit 237 that are components constituting the control device 23. For example, the packet processing unit 236 and the DNS processing unit 235 may be executed by different processors. As such, when the control device 23 includes a plurality of processors and components linked with each other are executed by different processors, the corresponding components may communicate with each other by an inter processor communication (IPC) method.

FIG. 2 illustrates an example in which, the terminal information collection unit 231, the flow control unit 232, the policy management unit 233, the policy application unit 234, the DNS processing unit 235, the packet processing unit 236, and the AP detection unit 237 are integrated into within one network protection device 13, but the embodiment of the present disclosure is not limited thereto. In another embodiment, at least some of these components may be implemented in a separate device outside the network protection device 13 or in the form of a cloud. For example, the policy management unit 233 may be implemented as a separate device outside the network protection device 13 or in the form of a cloud.

Hereinafter, a method for protecting a network of the network protection device 13 according to an embodiment will be described with reference to FIGS. 3 to 7. The methods described with reference to FIGS. 3 to 6 may be performed by the network protection device 13 described with reference to FIGS. 1A, 1B, and 2.

Figure 3:
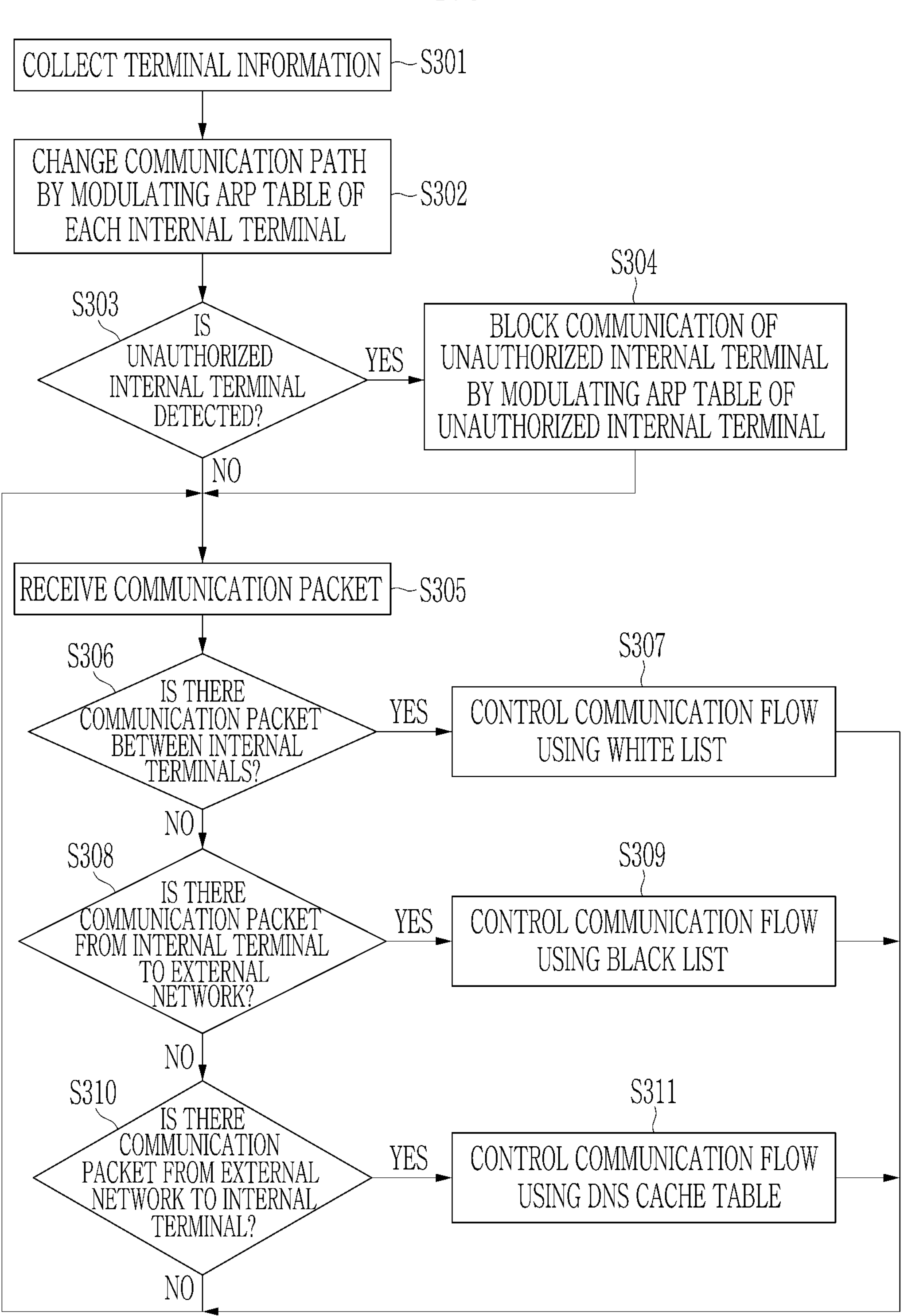
FIG. 3 is a diagram schematically illustrating a communication flow control method of the network protection device according to the embodiment.

FIG. 3 schematically illustrates a communication flow control method of the network protection device 13 according to the embodiment.

Referring to FIG. 3, the control device 23 of the network protection device 13 may collect the terminal information of the internal terminals 14 belonging to the target network 1 when the operation of the network protection device 13 is initiated (S301).

In step S301, the control device 23 may collect address information (IP address and MAC address) of each internal terminal 14 using the ARP request packet. The control device 23 may generate the ARP request packet while changing the IP address used as the destination address information within the IP address range assigned to the target network 1. The control device 23 may sequentially broadcast ARP request packets with changed destination address information to the internal terminals 14 and wait for reception of packets responding to the ARP request packets. Whenever the ARP response packet is received, the control device 23 may collect the address information of the internal terminals 14 connected to the target network 1 by acquiring the address information of the corresponding internal terminal 14 from the source address information included in the ARP response packet.

In step S301, the control device 23 may collect state information of each internal terminal 14 using the ARP packet. The control device 23 may generate the ARP request packet including the IP address of the internal terminal 14 whose online state is to be checked as the destination address information and broadcast the generated ARP request packet within the target network 1. Then, the control device 23 may determine the state information of the corresponding internal terminal 14 according to whether the ARP response packet for the transmitted ARP request packet is received as an online state or an offline state.

The control device 23 may change the communication path of each internal terminal 14 so that the communication flow of each internal terminal 14 is transmitted through the network protection device 13 by modulating the ARP table of each internal terminal 14 using the ARP packets and the terminal information of the internal terminals 14 collected through step S301 (S302).

In step S302, in order to change the communication paths of the internal terminals 14, the control device 23 may modulate the MAC addresses of other internal terminals 14 in the ARP table stored in each internal terminal 14. In order to modulate the MAC addresses of the internal terminals 14 in the ARP table, the control device 23 may generate the modulated ARP response packet that include the IP address of the internal terminal 14 whose MAC address is to be modulated and the modulated MAC address (MAC address of the network protection device 13) as the source address information. When the modulated ARP response packet is generated, the control device 23 may transmit the generated modulated ARP response packet in the unicast manner to the internal terminal 14 whose ARP table is to be modified to modulate the ARP table of the corresponding internal terminal 14. The internal terminal 14 which has received the modulated ARP response packet may acquire the IP address and modulated MAC address of the source from the received ARP response packet, and use the acquired IP address and modulated MAC address of the source to change the MAC address of the corresponding internal terminal 14 in its own ARP table.

In step S302, in order to change the communication path between the internal terminal 14 and the external terminal, the control device 23 may modulate the MAC address of the gateway in the ARP table stored in each internal terminal 14. In order to modulate the MAC address of the gateway (or switch 12 functioning as the gateway) in the ARP table of each internal terminal 14 into the MAC address of the network protection device 13, the control device 23 may generate the modulated ARP response packet that includes the IP address (IP address of the switch 12) of the gateway and the MAC address of the network protection device 13 as the source address information. When the modulated ARP response packet is generated, the control device 23 may transmit the generated modulated ARP response packet in the unicast manner to the internal terminal 14 whose ARP table is to be modified to modulate the ARP table of the corresponding internal terminal 14. The internal terminal 14, which has received the ARP response packet in which the MAC address of the gateway is modulated from the network protection device 13, may use the modulated MAC address of the gateway acquired from the ARP response packet to change the MAC address of the gateway in its own ARP table.

The control device 23 may detect the unauthorized internal terminal based on the terminal information collected from the internal terminals 14. When the unauthorized internal terminal is detected (S303), the control device 23 may modulate the ARP table of the unauthorized internal terminal to block the communication of the unauthorized internal terminal (S304).

In step S304, the control device 23 may generate the ARP response packet that is modulated to include the IP address and meaningless MAC address of each internal terminal 14 as the source address information and the IP address and MAC address of the unauthorized internal terminal as the destination address information. The control device 23 may transmit the ARP response packet thus modulated to the unauthorized internal terminal in the unicast manner. The unauthorized internal terminal that receives the ARP response packet may change the MAC address of the corresponding internal terminal 14 in its own ARP table to the meaningless MAC address that cannot communicate. Accordingly, the unauthorized internal terminal may not confirm the correct MAC addresses of the other internal terminals 14 belonging to the target network 1, so the communication with the other internal terminals 14 may be blocked.

In step S304, the control device 23 may generate the ARP response packet that is modulated to include the IP address and meaningless MAC address of the gateway as the source address information and the IP address and MAC address of the unauthorized internal terminal as the destination address information. The control device 23 may transmit the ARP response packet thus modulated to the unauthorized internal terminal in the unicast manner. The unauthorized internal terminal that receives the ARP response packet may change the MAC address of the gateway in its own ARP table to the meaningless MAC address that cannot communicate. Accordingly, the unauthorized internal terminal may not confirm the correct MAC address of the gateway, so the communication with the external network to be accessed through the gateway may be blocked.

After the communication paths of the internal terminals 14 change through step S302, the control device 23 may receive the communication packet that is generated inside the target network 1 or introduced into the target network 1 from the external network (S305).

When the received communication packet is the communication packet between the internal terminals 14 (S306), the control device 23 may control the corresponding communication flow using the white list (S307).

Figure 4:
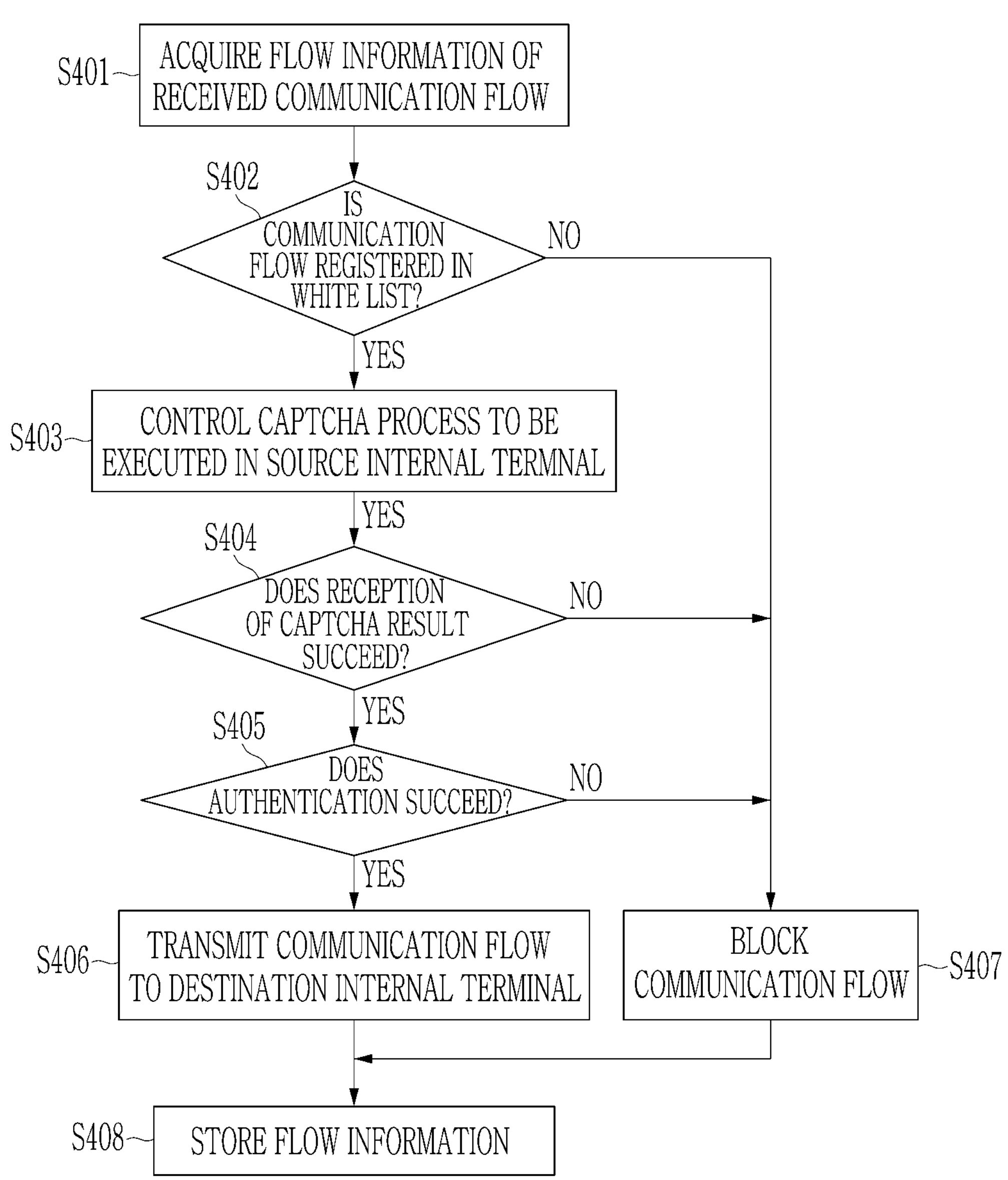
FIG. 4 is a diagram schematically illustrating a method for controlling a communication flow generated between internal terminals by the network protection device according to the embodiment.

FIG. 4 schematically illustrates a method for controlling a communication flow generated between the internal terminals 14 by the network protection device 13 according to the embodiment.

Referring to FIG. 4, the control device 23 may acquire the flow information by analyzing the communication flow received from the internal terminal 14 which is the source (S401).

In step S401, the flow information may be the 5-tuple information including the IP address and port number of the internal terminal 14 which is the source, the IP address and port number of the internal terminal 14 which is the destination, and the protocol information.

The control device 23 may determine whether the communication flow generated between the internal terminals 14 is the communication flow registered in the white list, based on the flow information acquired through step S401 (S402).

When the received communication flow is the communication flow registered in the white list, the control device 23 may normally transmit the corresponding communication flow to the internal terminal 14 which is the destination (S406). The control device 23 may additionally store the flow information of the corresponding communication flow in the flow cache table (S408).

When the received communication flow is the communication flow not registered in the white list, the control device 23 may block the corresponding communication flow without transmitting the corresponding communication flow to the internal terminal 14 which is the destination (S407). The packet processing unit 236 may also additionally store the flow information of the corresponding communication flow in the flow cache table (S408).

The control device 23 may additionally perform the CAPTCHA process, which is the security process, before proceeding to step S406. Even if the received communication flow is the communication flow registered in the white list, the control device 23 may control the CAPTCHA process to be executed in the internal terminal 14 which is the source (S403). Then, the control device 23 waits to receive the CAPTCHA result from the internal terminal 14, which is the source (S404), and when the CAPTCHA result is successfully received, the control device 23 may analyze the CAPTCHA result to determine whether the authentication is successful (S405).

When the CAPTCHA result corresponds to the successful authentication, the control device 23 may normally transmit the corresponding communication flow to the destination internal terminal 14 (S406). When the CAPTCHA result corresponds to the authentication failure, the control device 23 may block the corresponding communication flow without transmitting the corresponding communication flow to the internal terminal 14 which is the destination even if it is the communication flow registered in the white list (S407).

Referring back to FIG. 3, when the received communication packet is the communication packet transmitted from the internal terminal 14 to the external network (S308), the control device 23 may control the corresponding communication flow using the black list (S309).

Figure 5:
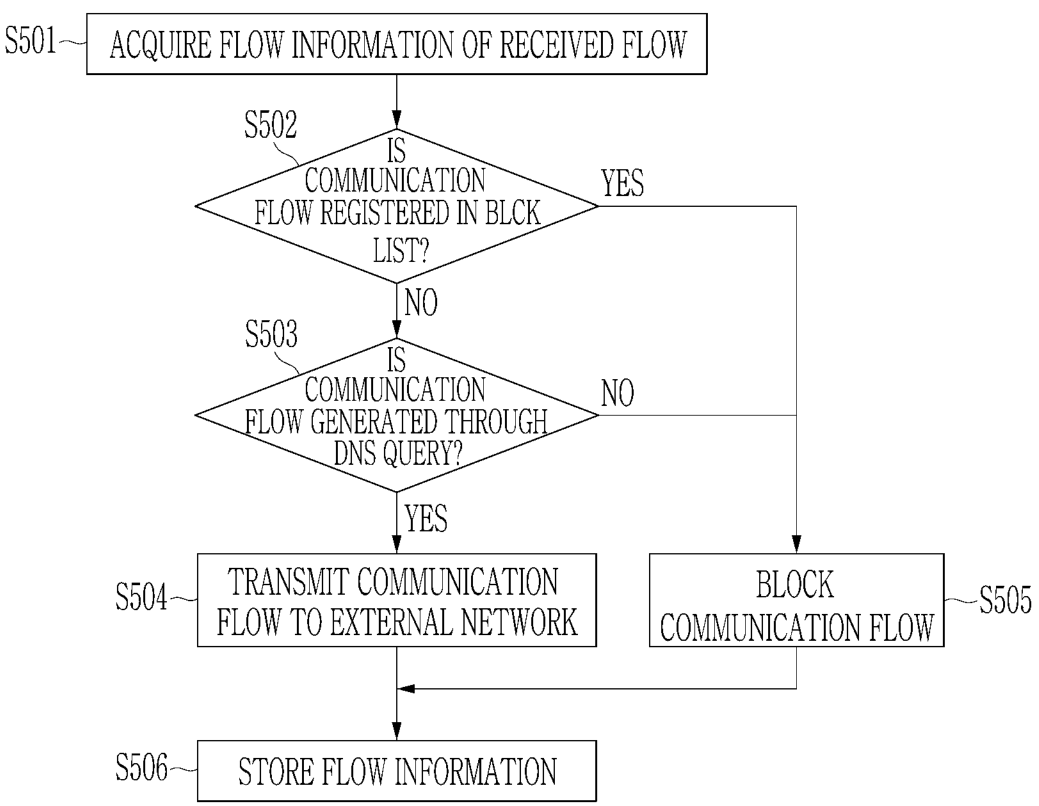
FIG. 5 is a diagram schematically illustrating a method for controlling a communication flow from an internal terminal to an external network by the network protection device according to the embodiment.

FIG. 5 schematically illustrates a method for controlling a communication flow from the internal terminal 14 to the external network by the network protection device 13 according to the embodiment.

Referring to FIG. 5, the control device 23 may acquire the flow information by analyzing the communication flow received from the internal terminal 14 which is the source (S501). In step S501, the flow information may be the 5-tuple information including the IP address and port number of the internal terminal 14 which is the source, the IP address and port number of the external terminal which is the destination, and the protocol information.

When the received communication flow is the communication flow registered in the black list, the control device 23 may block the corresponding communication flow (8505). The control device 23 may also additionally store the flow information of the corresponding communication flow in the flow cache table (S506).

When the received communication flow is the communication flow that is not registered in the black list, the control device 23 may use the DNS cache table to determine whether the corresponding communication flow is the communication flow that is generated through the DNS query (S503).

When the DNS request packet is generated from the internal terminal 14, the control device 23 may transmit the DNS request packet to the external network and then wait for the DNS response packet to be received from the external network. When the DNS response packet is received, the control device 23 may detect the DNS information (IP address and domain address) from the received DNS response packet and add the detected DNS information to the DNS cache table. Therefore, in step S503, the control device 23 may confirm whether the DNS information corresponding to the communication flow is registered in the DNS cache table and determine whether the corresponding communication flow is the communication flow that directly accesses the external network using the IP address without the DNS query.

When the control device 23 determines that the received communication flow is the communication flow that proceeds without the DNS query, the control device 23 may block the corresponding communication flow even if it is the communication flow that is not registered in the blacklist (8505) and store the flow information of the corresponding communication flow in the flow cache table (S506).

When the control device 23 determines that the received communication flow is the communication flow generated by performing the DNS query, the control device 23 may transmit the corresponding flow to the external network which is the destination (S504). The control device 23 may also additionally store the flow information of the corresponding communication flow in the flow cache table (S506).

Referring back to FIG. 3, when the received communication packet is the communication packet transmitted from the external terminal to the internal network 14 (S310), the control device 23 may control the corresponding communication flow using the DNS cache table (S311).

Figure 6:
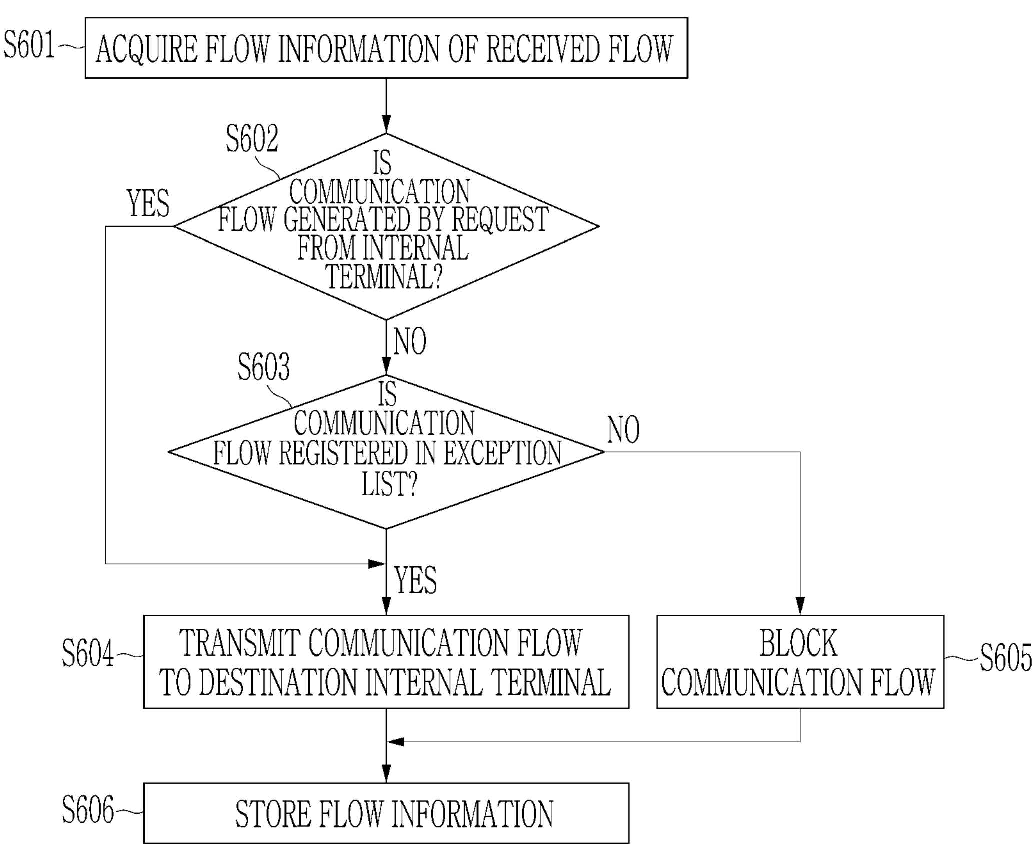
FIG. 6 is a diagram schematically illustrating a method for controlling a communication flow from an external network to an internal terminal by the network protection device according to the embodiment.

FIG. 6 is a diagram schematically illustrating a method for controlling a communication flow from the external network to the internal terminal 14 by the network protection device 13 according to the embodiment.

Referring to FIG. 6, the control device 23 may acquire the flow information by analyzing the communication flow transmitted from the external network to the internal terminal 14 of the target network 1 (S601). In step S601, the flow information may be the 5-tuple information including the IP address and port number of the external terminal which is the source, the IP address and port number of the internal terminal 14 which is the destination, and the protocol information.

The control device 23 may determine whether the corresponding communication flow is the communication flow generated by the request from the internal terminal 14, based on the flow information acquired through step S601 (S602).

In the case of the communication flow generated by the request from the internal terminal 14, the corresponding flow information may already be registered in the flow cache table. Accordingly, in step S602, the control device 23 may refer to the flow cache table to confirm whether the communication flow generated in the external network is the communication flow generated by the request from the internal terminal 14.

When the communication flow transmitted from the external network to the internal terminal 14 of the target network 1 is the communication flow generated by the request from the internal terminal 14, the control device 23 may transmit the communication flow to the internal terminal 14 which is the destination (S604). The control device 23 may also additionally store the flow information acquired from the corresponding communication flow in the flow cache table (S606).

When the communication flow transmitted from the external network to the internal terminal 14 of the target network 1 is not the communication flow generated by the request from the internal terminal 14, the control device 23 may confirm whether the corresponding communication flow is registered in the exception list (S603). When the communication flow transmitted from the external network to the internal terminal 14 of the target network 1 is registered in the exception list, the control device 23 may transmit the packets of the corresponding communication flow to the internal terminal 14 which is the destination (S604). On the other hand, when the communication flow transmitted from the external network to the internal terminal 14 of the target network 1 is not registered in the exception list, the control device 23 may block the corresponding communication flow (S605) and store the corresponding flow information in the flow cache table (S606).

Figure 7:
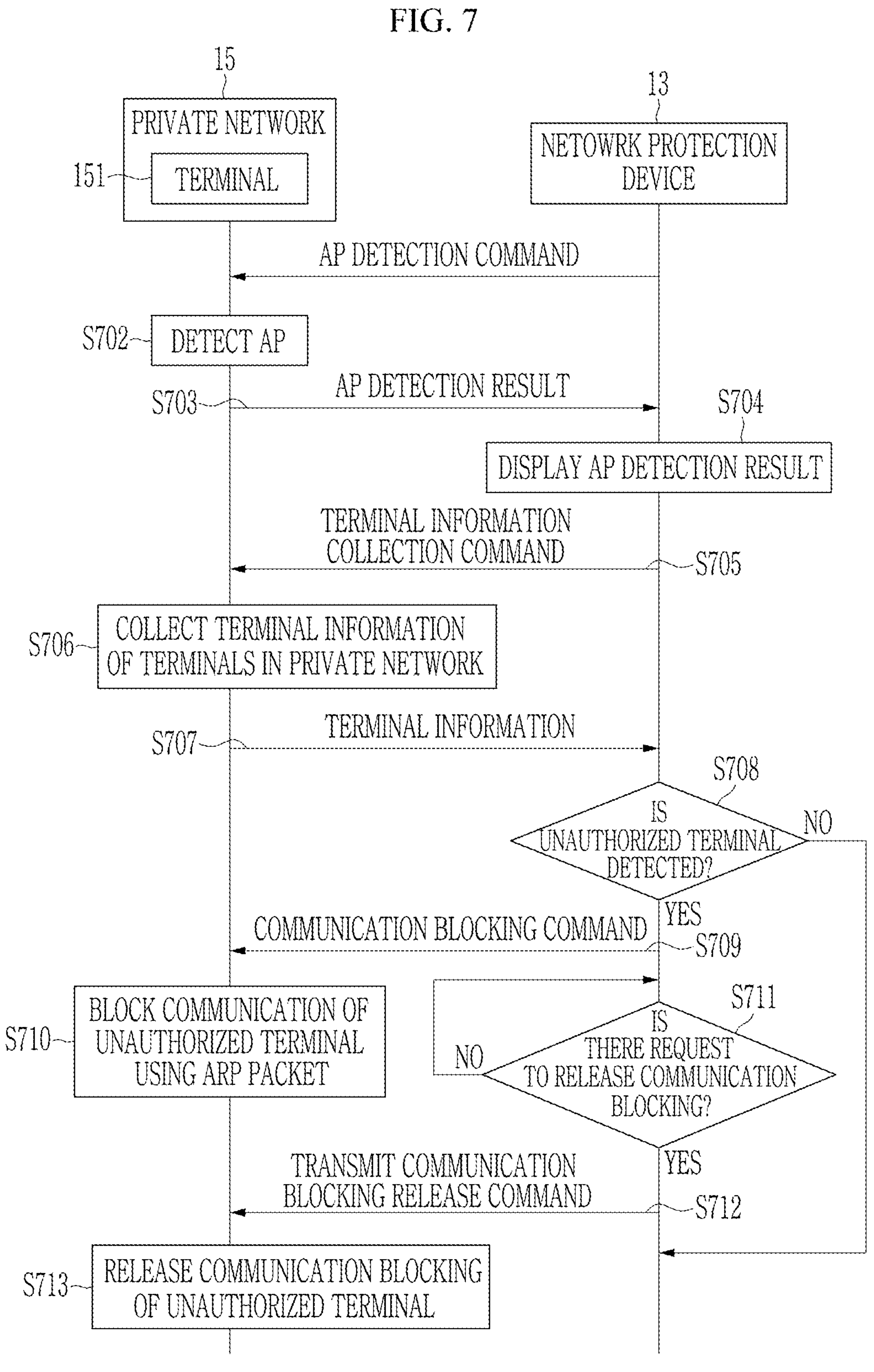
FIG. 7 is a diagram schematically illustrating a method of managing a private network by the network protection device according to the embodiment.

FIG. 7 schematically illustrates a method of managing a private network by the network protection device 13 according to the embodiment.

Referring to FIG. 7, the control device 23 of the network protection device 13 may transmit a command instructing the detection of the AP 151 to the terminal 16 in which an agent is installed among the terminals 16 belonging to the private network 15 (S701). The terminal information of the terminal 16 in which the agent is installed may be registered in the network protection device 13 when the agent is installed. Accordingly, the control device 23 may refer to the pre-registered terminal information to transmit a command to the agent of the terminal 16 belonging to the private network 15.

The agent of the terminal 16 that receives this command may use the traceroute command to detect the number of APs 151 located on the communication path between the corresponding terminal 16 and the network protection device 13. In addition, the agent of the terminal 16 may transmit the AP detection result including the information on the detected number of APs 151 to the network protection device 13 (S703).

When the AP detection result is received, the control device 23 of the network protection device 13 may display the received AP detection result on the screen (S704) and notify the administrator of the target network 1 of the received AP detection result. In addition, the control device 23 of the network protection device 13 may transmit a command to collect the information on the terminals 16 connected to the detected AP 151 to the agent installed in the terminal 16 (S705).

The agent of the terminal 16 that has received this command may collect the terminal information (IP address and MAC address) of the terminals 16 connected to the AP 151 within the private network 15 using the ARP packet (S706). Then, the agent of the terminal 16 may transmit the collected terminal information to the network protection device 13 (S707).

The control device 23 of the network protection device 13 that has received the terminal information may detect the unauthorized terminal among the terminals 16 in the private network 15 based on the received terminal information (S708). When the unauthorized terminal is detected within the private network 15, the control device 23 of the network protection device 13 may transmit a command instructing to block the communication of the unauthorized terminal to the agent of the terminal 16 (S709).

The agent of the terminal 16 that has received the communication blocking command may block the communication of the unauthorized terminal existing in the private network 15 using the ARP packet (S710).

When the administrator wishes to permit the communication for the unauthorized terminal 16 whose communication is blocked, the administrator may request the network protection device 13 to release the communication blocking. When the control device 23 of the network protection device 13 receives the request from the administrator to release the communication blocking of the unauthorized terminal (S711), the control device 23 may transmit a command to release the communication blocking to the agent of the terminal 16 (S712).

The agent of the terminal 16 may maintain the communication blocking state of the unauthorized terminal by continuously transmitting blocking ARP packets before the communication blocking release command is received. When the agent of the terminal 16 receives the communication blocking release command, the agent of the terminal 16 may stop transmitting the blocking ARP packet and release the communication blocking of the unauthorized terminal whose communication is blocked (S713).

According to the above description, the network protection device 13 may manage the access rights between the internal terminals 14 using the white list. Therefore, in the case of the internal terminal 14 that suffer significant damage when infected with malicious codes, such as servers where the key information is stored, by strictly restricting access to other internal terminals 14 other than essential connections using the white list, damage caused by the malicious code infection may be minimized. The network protection device 13 may strengthen the security function against the exceptional flows generated by the background process of the internal terminal 14 by using additional security processes such as CAPTCHA. The network protection device 13 may collect the process information on the processes executed in the background from the internal terminals 14 located in the target network 1, and compare the collected process information with the information registered in the white list, thereby detecting the malware infection of the internal terminal 14. The network protection device 13 may prevent additional damage caused by the malware infection by blocking the communication flow generated from the internal terminal 14 that is determined to be infected with the malware.

When the communication flow from the internal terminal 14 of the target network 1 to the external network is generated, the network protection device 13 refers to the DNS cache table in which the DNS information is stored to determine whether the corresponding communication flow is the communication flow directly accessing the external network using the IP address without the DNS query. As a result of the determination, when it is determined that the corresponding communication flow is the communication flow that proceeds without the DNS query, the corresponding flow may be blocked. When the communication flow is generated from the external network to the internal terminal 14, the network protection device 13 may refer to the flow cache table to determine whether the corresponding communication flow is generated by the request from the internal terminal 14. When the communication flow generated from the external network to the internal terminal 14 is not generated by the request from the internal terminal 14, the network protection device 13 may block the corresponding communication flow. In this way, the network protection device 13 may detect and block the communication flow that is determined not to be generated by normal procedures between the internal terminal 14 and the external network, thereby preventing the malicious code from spreading from the target network 1 to the external network, preventing the malicious code from being introduced from the external network to the target network 1, etc.

The network protection device 13 may manage websites, etc., determined to be harmful by the administrator by registering the websites in the black list, manage websites that should permit the access to the target network 1 as the exception list by registering the websites in the exception list, and refer to the black list or the exception list to manage the communication flow between the target network 1 and the external network, thereby additionally blocking the malicious or harmful access to the target network 1 and preventing the unnecessary access blocking from occurring.

The network protection device 13 may automatically detect the AP 151 connected inside the target network 1 and transmit the detection result to the administrator so that the administrator may identify weak points in security. In addition, the network protection device 13 may easily block the unauthorized terminal that is not permitted to access the administrator within the private network 15 by linking with the terminal 16 belonging to the private network 15.

The above-described embodiment may be implemented as computer-readable code on a medium in which a program is recorded. The computer-readable media includes all types of recording apparatus that store data that may be read by a computer system. An example of the computer readable medium may include a hard disk drive (HDD), a solid state disk (SSD), a silicon disk drive (SDD), a read only memory (ROM), a random access memory (RAM), a compact disk read only memory (CD-ROM), a magnetic tape, a floppy disk, an optical data storage, and the like, and also include a medium implemented in a form of a carrier wave (e.g., transmission through the Internet). In addition, the computer may include a terminal control unit. Therefore, the above-described detailed description is to be interpreted as being illustrative rather than being restrictive in all aspects. The scope of the present disclosure is to be determined by reasonable interpretation of the claims, and all modifications within an equivalent range of the present disclosure fall in the scope of the present disclosure.

What is claimed is:

1. A network protection device, comprising:
a communication device;
a storage device configured to store a white list that defines access rights between a plurality of first terminals belonging to a target network; and
a control device configured to modulate an address resolution protocol (ARP) table of each of the plurality of first terminals using an ARP packet so that a first communication flow generated between the plurality of first terminals is received by the communication device, and block the first communication flow or transmit the first communication flow to a destination based on the white list when the first communication flow is received,
wherein the control device is further configured to:
modulate the ARP table of each of the plurality of first terminals using an ARP packet so that a second communication flow transmitted from any one of the plurality of first terminals to an external network is received by the communication device;
store domain name system (DNS) information of a DNS response packet in a DNS table when the DNS response packet is received from the external network; and
block the second communication flow without transmitting the second communication flow to a destination when it is determined that the second communication flow is a communication flow generated without a DNS query by referring to the DNS table, and
wherein the DNS information includes an IP address and a domain address included in the DNS response packet.

2. The network protection device of claim 1, wherein:
the control device is further configured to:
generate an ARP response packet including, as a source address information, an IP address of a first terminal in which a media access control (MAC) address is to be modified within the ARP table and the MAC address of the network protection device; and
modulate the ARP table by transmitting the ARP response packet to each of the plurality of first terminals.

3. The network protection device of claim 2, wherein:
the control device is further configured to collect address information of each of the plurality of first terminals using an ARP request packet, and
the address information includes an IP address and a MAC address of the corresponding first terminals.

4. The network protection device of claim 3, wherein:
the control device is further configured to:
detect an unauthorized terminal among the plurality of first terminals based on the address information; and
modify a MAC address included in an ARP table of the unauthorized terminal into a MAC address with which communication is not possible using an ARP packet to block a communication by the unauthorized terminal.

5. The network protection device of claim 1, wherein:
the control device is further configured to:
execute a completely automated public turing test to tell computers and humans apart (CAPTCHA) process in a first terminal which is a source of the first communication flow when the received first communication flow is a communication flow permitted to access by the white list; and block the received first communication flow or transmit the received first communication flow to a destination according to a CAPTCHA authentication result in the first terminal which is the source.

6. The network protection device of claim 1, wherein:

the storage device further stores a black list that defines access rights between the plurality of first terminals and the external network of the target network, and the control device is further configured to:

block the second communication flow or transmit the second communication flow to the external network based on the black list when the second communication flow is received.

7. The network protection device of claim 6, wherein:

the control device is further configured to:

generate an ARP response packet including an IP address of a gateway connected between the plurality of first terminals and the external network and a MAC address of the network protection device as source address information, and modulate a MAC address of the gateway in the ARP table by transmitting the ARP response packet to each of the plurality of first terminals.

8. The network protection device of claim 1, wherein:

the control device is further configured to:

store flow information of a communication flow whose source or destination is the plurality of first terminals in a flow table;

determine whether a third communication is a communication flow generated by a request from any one of the plurality of first terminals by referring to the flow table when the third communication flow directed to any one of the plurality of first terminals is received from an external network of the target network; and transmit the third communication flow to the first terminal as the destination when it is determined that the third communication flow is a communication flow generated by a request from any one of the plurality of first terminals, and the flow information includes address information of the source and destination of the corresponding communication flow and protocol information.

9. The network protection device of claim 8, wherein:

the control device is further configured to:

instruct a second terminal on which an agent is installed to detect an access point (AP) located on a communication path between the network protection device and the second terminal, instruct the second terminal to collect terminal information of at least one third terminal connected to the AP when the AP is detected in the communication path by the second terminal;

receive address information of the at least one third terminal collected by the second terminal using an ARP packet from the second terminal;

detect an unauthorized terminal among the at least one third terminal based on the address information of the at least one third terminal; and instruct the second terminal to block the communication of the unauthorized terminal using an ARP packet when the unauthorized terminal is detected.

10. A method for protecting a network of a network protection device, comprising:

modulating an ARP table of each of a plurality of first terminals belonging to a target network using an ARP packet so that a first communication flow generated between the plurality of first terminals is received by the network protection device;

blocking the first communication flow or transmitting the first communication flow to a destination based on a white list defining access rights between the plurality of first terminals when the first communication flow is received;

modulating the ARP table using an ARP packet so that a second communication flow transmitted from any one of the plurality of first terminals to an external network of the target network is received by the network protection device;

whenever a DNS response packet is received from the external network, storing DNS information of the received DNS response packet in a DNS table;

determining whether the second communication flow is a communication flow generated without a DNS query by referring to the DNS table; and blocking the second communication flow without transmitting the second communication flow to a destination when the second communication flow is a communication flow generated without a DNS query, and wherein the DNS information includes an IP address and a domain address included in the DNS response packet.

11. The method of claim 10, wherein:

the modulating includes:

generating an ARP response packet including, as a source address information, an IP address of a first terminal in which a media access control (MAC) address is to be modified within the ARP table and a MAC address of the network protection device; and modulating the ARP table by transmitting the ARP response packet to each of the plurality of first terminals.

12. The method of claim 11, further comprising:

collecting address information for each of the plurality of first terminals using an ARP request packet, wherein the address information includes an IP address and a MAC address of the corresponding first terminal.

13. The method of claim 12, further comprising:

detecting an unauthorized terminal among the plurality of first terminals based on the address information; and modifying a MAC address included in an ARP table of the unauthorized terminal into a MAC address with which communication is not possible using an ARP packet to block a communication by the unauthorized terminal.

14. The method of claim 10, further comprising:

executing a CAPTCHA process in a first terminal that is a source of the first communication flow; and receiving a CAPTCHA authentication result from the first terminal that is the source, wherein the blocking of the first communication flow or the transmitting of the first communication flow to the destination includes blocking the first communication flow or transmitting the first communication flow to a destination based on the CAPTCHA authentication result and the white list.

15. The method of claim 10, further comprising:

blocking the second communication flow or transmitting the second communication flow to the external network by referring to a black list defining access rights between the plurality of first terminals and the external network when the second communication flow is received.

16. The method of claim 15, wherein:

the modulating of the ARP table so that the second communication flow is received by the network protection device includes:

generating an ARP response packet including an IP address of a gateway connected between the plurality of first terminals and the external network and a MAC address of the network protection device as source address information; and modulating a MAC address of the gateway in the ARP table by transmitting the ARP response packet to each of the plurality of first terminals.

17. The method of claim 10, further comprising:

whenever the communication flow is generated with the plurality of first terminals as the source or destination, storing flow information of the generated communication flow in a flow table;

receiving a third communication flow from the external network of the target network to any one of the plurality of first terminals; and transmitting the third communication flow to a first terminal as the destination when it is determined by referring to the flow table that the third communication flow is a communication flow generated by a request from any one of the plurality of first terminals, wherein the flow information includes address information of the source and destination of the corresponding communication flow and protocol information.

* * * * *